United States Patent
Shyu et al.

(10) Patent No.: US 7,944,633 B2
(45) Date of Patent: May 17, 2011

(54) LENS HOLDER FOR ALIGNMENT OF STACKED LENS MODULE AND MANUFACTURING METHOD THEREOF

(75) Inventors: San-Woei Shyu, Taipei (TW); Huang-Chang Chen, Taipei (TW); Chih-Peng Wang, Taipei (TW); Te-Cheng Lin, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 12/557,251

(22) Filed: Sep. 10, 2009

(65) Prior Publication Data
US 2011/0026144 A1 Feb. 3, 2011

(30) Foreign Application Priority Data

Jul. 28, 2009 (TW) ................................ 98125424 A

(51) Int. Cl.
*G02B 7/02* (2006.01)
(52) U.S. Cl. ........................................ 359/819; 359/811
(58) Field of Classification Search .......... 359/694–700, 359/811–824; 264/1.1–2.7
See application file for complete search history.

(56) References Cited

U.S. PATENT DOCUMENTS

| | | | |
|---|---|---|---|
| 5,923,805 A | 7/1999 | Anderson et al. | |
| 6,710,945 B1 * | 3/2004 | Miranda | 359/819 |
| 6,825,503 B2 | 11/2004 | Huang | |
| 7,095,572 B2 * | 8/2006 | Lee et al. | 359/808 |
| 7,221,524 B2 * | 5/2007 | Ye et al. | 359/819 |
| 7,224,542 B2 | 5/2007 | Kuchimaru | |
| 7,312,933 B2 | 12/2007 | Shyu et al. | |
| 7,332,110 B2 | 2/2008 | Inoue et al. | |
| 7,471,464 B2 * | 12/2008 | Kageyama | 359/699 |
| 7,768,724 B2 * | 8/2010 | Tsai et al. | 359/819 |
| 2007/0024989 A1 | 2/2007 | Kageyama | |
| 2007/0047109 A1 | 3/2007 | Shibata et al. | |
| 2009/0059398 A1 | 3/2009 | Tsai et al. | |

FOREIGN PATENT DOCUMENTS

| | | |
|---|---|---|
| JP | 62251113 | 10/1987 |
| JP | 06258562 | 9/1994 |
| JP | 07120610 | 5/1995 |
| JP | 3650594 | 2/2003 |
| JP | 3791615 | 4/2005 |
| TW | 0528279 | 4/2002 |
| TW | M337077 | 3/2006 |
| TW | M313317 | 12/2006 |

* cited by examiner

*Primary Examiner* — Mohammed Hasan
(74) *Attorney, Agent, or Firm* — Muncy, Geissler, Olds, & Lowe, PLLC

(57) ABSTRACT

A lens holder for alignment of a stacked lens module and a manufacturing method thereof are revealed. A stacked lens submodule disposed with at least one first alignment fixture is used as a molding insert to be set into a mold arranged with a second alignment fixture where the first alignment fixture connects with the second alignment fixture correspondingly. Then by injection or press molding of the embedded molding insert, a lens module with the lens holder for alignment is formed. Thereby the conventional manufacturing method of the lens molder is improved, the processes are simplified and the yield rate is increased. Moreover, the molded lens module is packed into the lens more easily so that it is suitable to be applied to camera lenses, small lenses and mobile phone lenses.

5 Claims, 8 Drawing Sheets

LENS HOLDER FOR ALIGNMENT OF STACKED LENS MODULE AND MANUFACTURING METHOD THEREOF

BACKGROUND OF THE INVENTION

The present invention relates to a lens holder for alignment of a stacked lens module and a manufacturing method thereof, especially to a lens module with a lens holder for alignment formed by injection or press molding of an embedded molding insert that is a stacked lens submodule. This kind of lens module is especially suitable for camera lenses, small lenses, and mobile phone lenses.

The optical lens is a compact optical element in cameras or lenses of camera phones. In practice, the optical element is formed by at least one optical lens. Refer to FIG. 1, an optical lens 20a is made from optical plastic or optical glass and having an optical surface 21a that generally is a round surface, and an outer periphery 22a around the optical surface 21a that can be round or rectangular. In order to fix and package the lens 20a inside a lens module, the lens 20a is glued and fixed in a holding ring (or holder) 10a to form an optical lens set (or assembly) 1a while the holding ring 10a is made from metal or plastic. Thus the lens 20a is aligned with a central axis (optical axis) of the lens module. Moreover, by an actuator, the holding ring 10a (or the optical lens set 1a) moves inside the lens module so as to achieve zoom in/zoom out, as shown in U.S. Pat. Nos. 7,312,933, 7,095,572, US2007/0024989 and JP3650594.

A conventional way of fixing the plastic or glass lens 20a in the holding ring 10a is shown in FIG. 1, especially suitable for glass lens. At first, provide a holding ring 10a according to shape of the outer periphery 22a of the lens 20a such as round or rectangular shape. Then the lens 20a is set into a preset hole of holding ring 10a for being located. Next use glue to fix the lens 20a where the glue is UV glue that requires a curing process such as being radiated in a UV curing oven for curing. Due to compact size of the lens 20a, the optical surface 21a is easy to get scratched or attach with the glue (flow) when the lens 20a is located and fixed by automatic or manual gluing. Thus the processes take time and the yield rate is poor. The curing process of the UV curing glue between the glass lens 20a and the plastic holding ring 10a is especially difficult. Moreover, the curing in the UV curing oven takes long time and the yield rate is poor. Thus the cost is unable to be reduced, as prior arts in JP3791615, JP06-258562, U.S. Pat. No. 7,224,542 and US 2007/0047109.

A technique that places a molding insert in a mold cavity and then treated with injection molding is called a molding insert injection molding method. A molding insert (for example, metal part) is set into a mold cavity of a preset mold. Then inject melt plastic (or rubber) material to fill a preset molding area (material injecting area) and cover whole or part of the molding insert. After cooling and curing, the product is released from the mold. Such manufacturing method is applied broadly to electric elements, connector, mechanical parts and LED, as disclosed in U.S. Pat. No. 5,923,805, TWM313317, and JP07-120610 etc. While manufacturing a cover with plastic lens by such method, the cover (a housing) is used as a molding insert and put into a mold cavity. Then a plastic lens is made by plastic injection and is integrated with the cover. Or use the plastic lens as a molding insert and the cover is made by plastic injection and integrated with the plastic lens so as to form an integrated cover with plastic lens, as shown in TW 0528279 and U.S. Pat. No. 6,825,503. Refer to JP62-251113, the glass plate is used as an molding insert and is covered by plastic material so as to form a window glass or other parts. Refer to U.S. Pat. No. 6,710,945, by two injection holes for plastic material, a molded lens and a lens holder are molded by injection sequentially. Or use infrared gas as the molding insert and produce a mount covering the glass by injection molding. Refer to U.S. Pat. No. 7,332,110, in a press molding, the eyeglass frame is used as an molding insert and is placed into a mold cavity. The preform of the plastic lens is heated to a melt status and then the soft preform is turned into the shape of the cavity by heating and pressing of the mold Thus the preform becomes a lens and integrated with the eyeglass frame to form an eyeglass. However, the press molding technique is unable to be applied to a manufacturing process that integrated the glass lens with the plastic holding ring. Once the plastic holding ring is used as a molding insert, the softening point of the optical glass is about 500° C. that is far more higher than the deformation temperature such as 80° C. of the plastic holding ring. Thus when the temperature of the mold achieves the softening point of the optical glass, the plastic holding ring has already deformed and unable to be molded. Therefore, the press molding is unable to be applied to mass production of the product that uses a plastic holding ring as an molding insert and glass as molding material.

In addition, as to manufacturing of the lens module revealed in US2009/0059398, an optical lens, an alignment fixture and a sensor are mounted into a mold and then inject plastic to form a lens module. Or as shown in FIG. 2, as shown in TWM337077, two optical glass lenses 20b, two light shields 30b, a spacer 40b are used as molding inserts to be mounted into molds 31b, 32b in turn. Then a lens holder together with the above molding inserts being covered form a lens module by plastic injection molding or press molding. However, such technique is unable to be used in the stacked lens submodule already being assembled. Because the stacked lens submodule is an integrated part and is unable to be separated into each single element to be set into a mold. Moreover, the optical axes of the optical lenses 20b, 30b, 40b are difficult to be aligned with one another. It takes time and efforts for alignment of the optical axis and this leads to low production rate and poor precision.

Due to requirement of high precision of the optical lens set for cameras, the lens holder outside a stacked lens submodule needs high precision. The location precision between the stacked lens submodule and the lens holder has great effects on imaging of the lens. Thus how the stacked lens submodule and the lend holder are aligned with an optical axis affects resolution of the images. Therefore, there is a need to develop a new technique applied to assembling of the stacked lens submodule with the lens holder and mass-produce lens modules with good alignment precision by simplified manufacturing processes.

SUMMARY OF THE INVENTION

Therefore it is a primary object of the present invention to provide a lens holder for alignment of stacked lens modules and a manufacturing method thereof. A stacked lens submodule is used as a molding insert put into a mold cavity. By injection molding or press molding of the molding insert, an integrated module having a stacked lens submodule and a lens holder is formed and is applied to assembled lenses of LED light sources/Solar Conversion Systems or optical lenses of cameras/mobile phone cameras. The stacked lens submodule includes at least one optical lens and optical element stacked and assembled by glue. The optical element include one of the followings or their combinations: an optical lens, a spacer, an aperture, a cover glass, an infrared(IR)-cut glass, an image sensor, and so on. The glue can be thermoset adhesive or ultraviolet curing adhesive. The lens holder for alignment of stacked lens modules features on that: the stacked lens submodule is disposed with at least one first alignment fixture that is concentric with optical axis. The first alignment fixture can be an alignment bump or an alignment groove. By connection between the first alignment fixture and a corresponding second alignment fixture arranged at the mold, the stacked lens submodule is aligned. Thus the optical axis of the stacked lens submodule is aligned with a central axis of the molded lens holder for alignment. The second alignment fixture can be an alignment bump or an alignment groove corresponding to the first alignment fixture.

An injection molding method of a lens holder for alignment according to the present invention includes following steps:

S1: providing a stacked lens submodule disposed with at least one first alignment fixture such as alignment bump or alignment groove aligned with an optical axis of the stacked lens submodule;

S2: providing an injection mold of a lens holder having an upper mold and a lower mold while the lower mold is arranged with at least one second alignment fixture such as alignment bump or alignment groove also aligned with an optical axis of the stacked lens submodule;

S3: putting the stacked lens submodule into the upper mold and the lower mold and the first alignment fixture of the stacked lens submodule is connected with the second alignment fixture of the lower mold for alignment and fixing of the stacked lens submodule;

S4: heating plastic material to preset temperature and inject the plastic material through a sprue of the mold so as to form a lens holder with an alignment fixture for alignment of the stacked lens submodule;

S5: after cooling and curing of the plastic material, separate the upper mold and the lower mold so as to release a stacked lens module with the first alignment fixture.

The lens holder of the present invention can also be produced by a press molding method having steps from SS1 to SS5.

SS1: providing a stacked lens submodule disposed with at least one first alignment fixture such as alignment bump or alignment groove aligned with an optical axis of the stacked lens submodule;

SS2: providing an press mold of a lens holder having an upper mold and a lower mold while the lower mold is arranged with at least one second alignment fixture such as alignment bump or alignment groove also aligned with an optical axis of the stacked lens submodule;

SS3: putting the stacked lens submodule into the upper mold and the lower mold and the first alignment fixture of the stacked lens submodule is connected with the second alignment fixture of the lower mold for alignment and fixing of the stacked lens submodule;

SS4: setting plastic material with preset weight (or perform) into a preset area for molding of the lens holder in the press molding mold, heating the press molding mold to melt the plastic at preset temperature and applying pressure to the press molding mold so as to make the melted plastic flow into a cavity of the press molding mold and form the lens holder for alignment around the stacked lens submodule;

SS5: after cooling and curing of the plastic material, separate the upper mold and the lower mold so as to release a stacked lens module with the first alignment fixture.

It is another object of the present invention to provide a lens holder for alignment of a stacked lens module and a manufacturing method thereof. The lens holder for alignment further includes a third alignment fixture such as alignment groove that is formed by demolding of a fourth alignment fixture (such as alignment pin) on the mold (such as the upper mold). Thus the optical axis of the stacked lens submodule is aligned with a central shaft of the molded lens holder for alignment to prevent oblique position. The manufacturing method of the lens holder for alignment of a stacked lens module includes following steps:

SSS1: providing a stacked lens submodule disposed with a first alignment fixture aligned with an optical axis of the stacked lens submodule;

SSS2: providing an injection mold or an press mold of a lens holder having an upper mold and a lower mold while the lower mold is disposed with a second alignment fixture that faces toward the optical axis of the stacked lens submodule and the upper mold is arranged with a fourth alignment fixture;

SSS3: put the stacked lens submodule between the upper mold and the lower mold to be aligned and fixed by the second alignment fixture of the lower mold and also be pressed by the fourth alignment fixture of the upper mold so as to prevent oblique position of the stacked lens submodule;

SSS4: injecting plastic into a mold cavity so as to form a lens holder by injection molding or press molding;

SSS5: after cooling and curing of the plastic, separate the upper mold and the lower mold to release a stacked lens module integrated with the stacked lens submodule and having the lens holder for alignment, the first alignment fixture and a third alignment fixture.

DETAILED DESCRIPTION OF THE PREFERRED EMBODIMENT

Embodiment One

Figure 2:
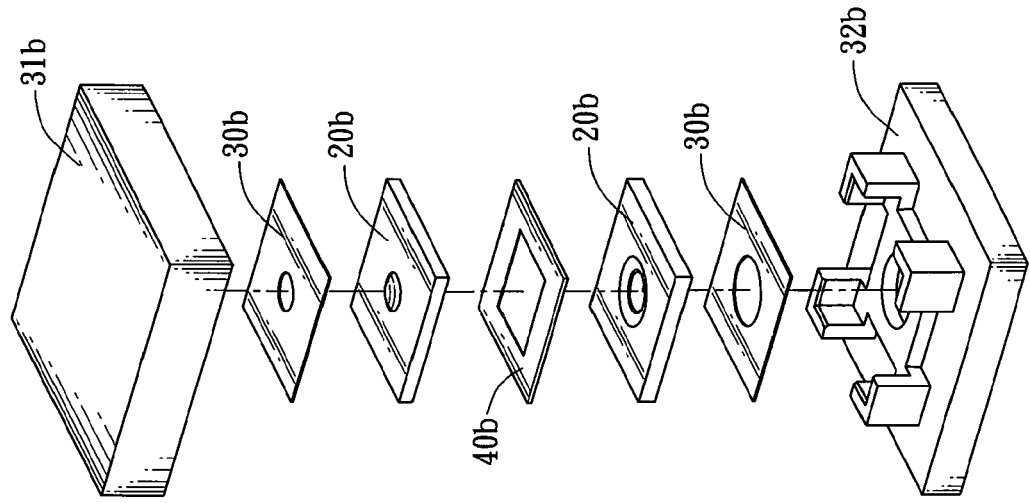
FIG. 2 is a schematic drawing showing another prior art.
Figure 1:
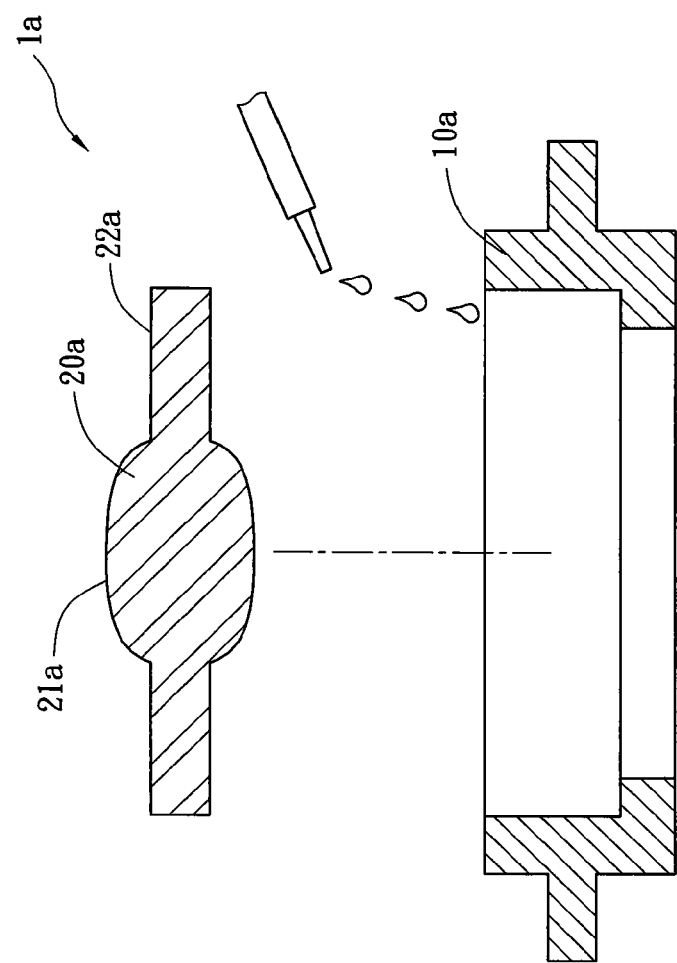
FIG. 1 is a schematic drawing showing a prior art.
Figure 3:
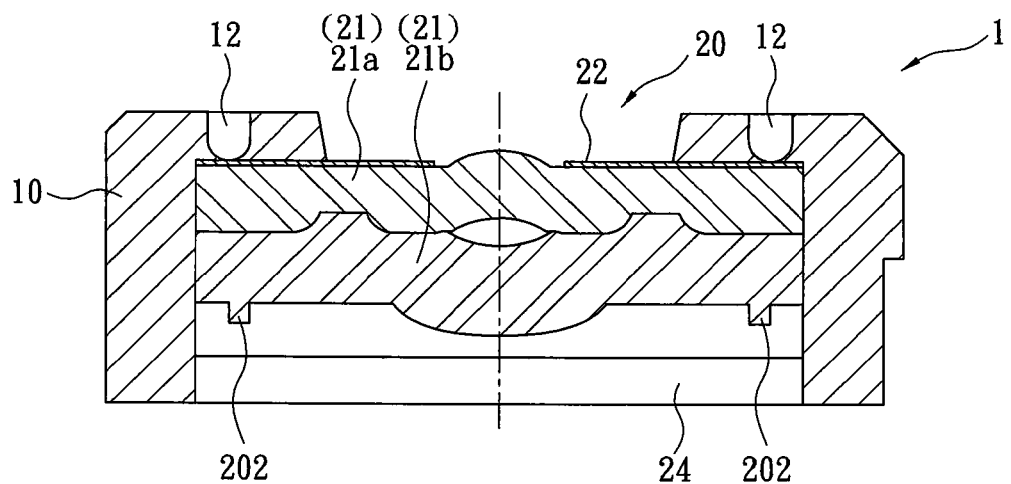
FIG. 3 is a cross sectional view of an embodiment applied to a rectangular stacked lens module of camera lenses according to the present invention.
Figure 4:
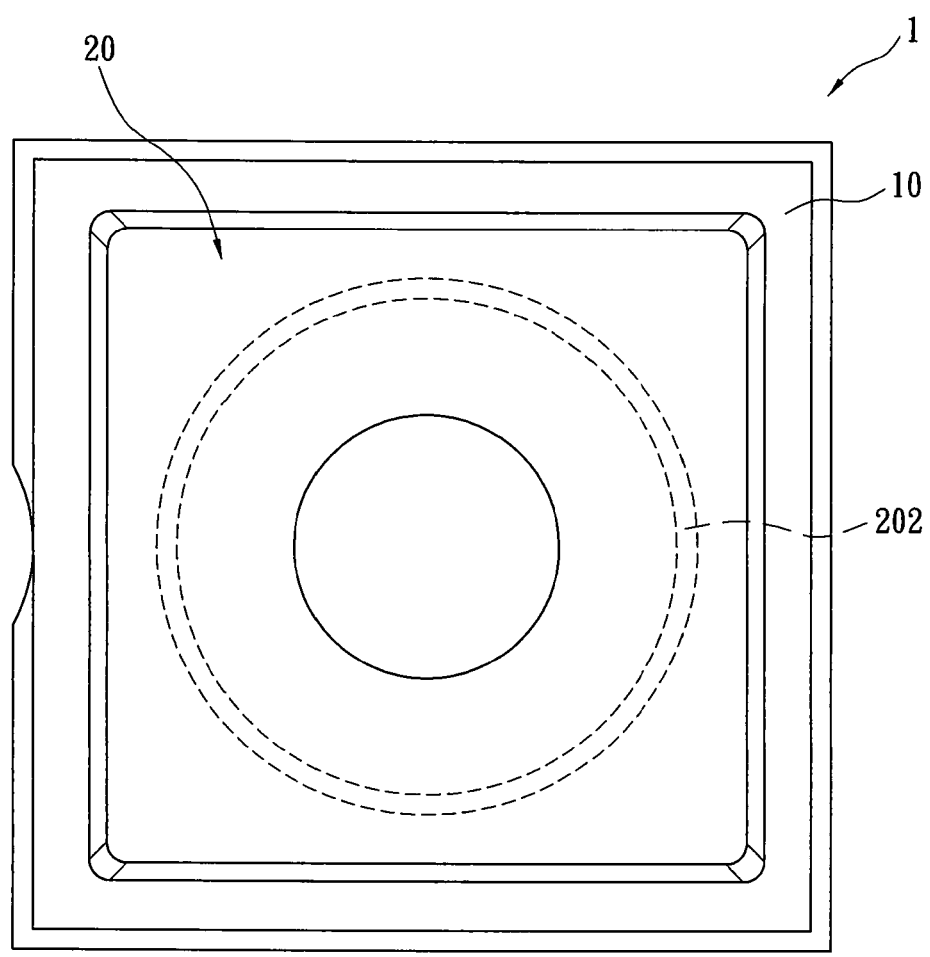
FIG. 4 is a bottom view of the embodiment in FIG. 3.
Figure 5:
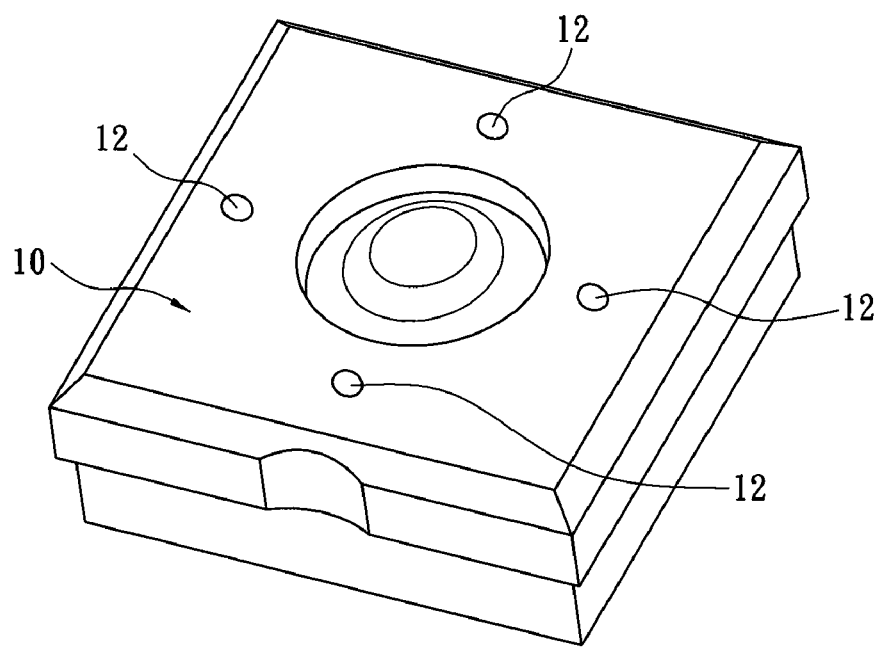
FIG. 5 is a top view of a lens holder for alignment of the embodiment in FIG. 3.
Figure 6:
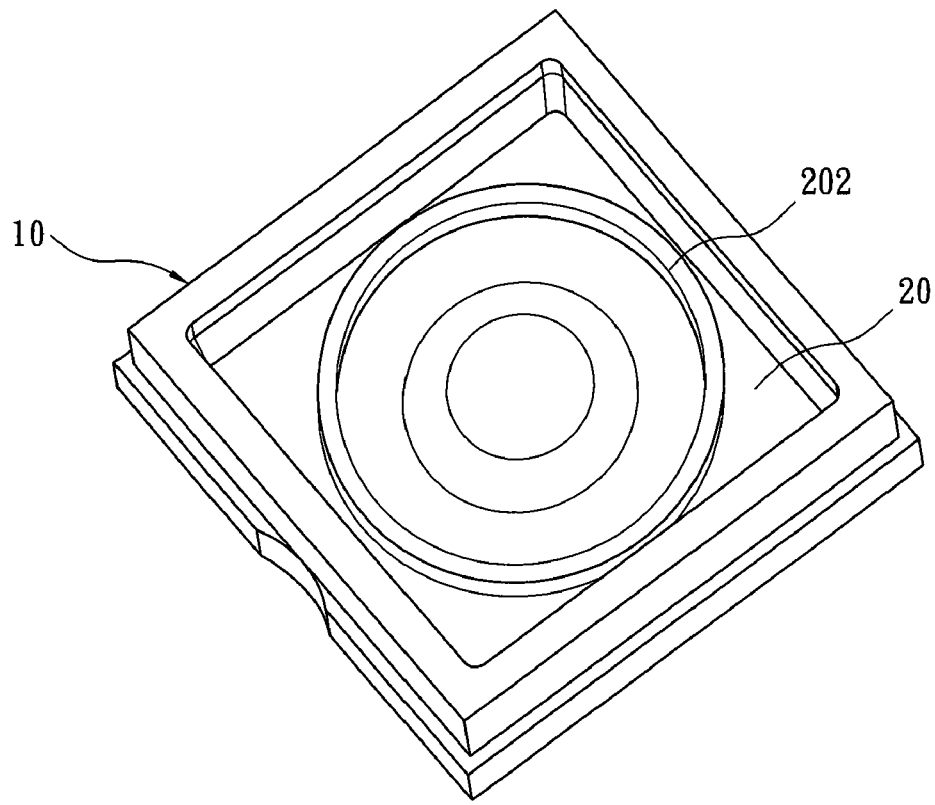
FIG. 6 is a bottom view of the lens holder for alignment including a stacked lens submodule but without IR-cut filter of the embodiment in FIG. 3.
Figure 7:
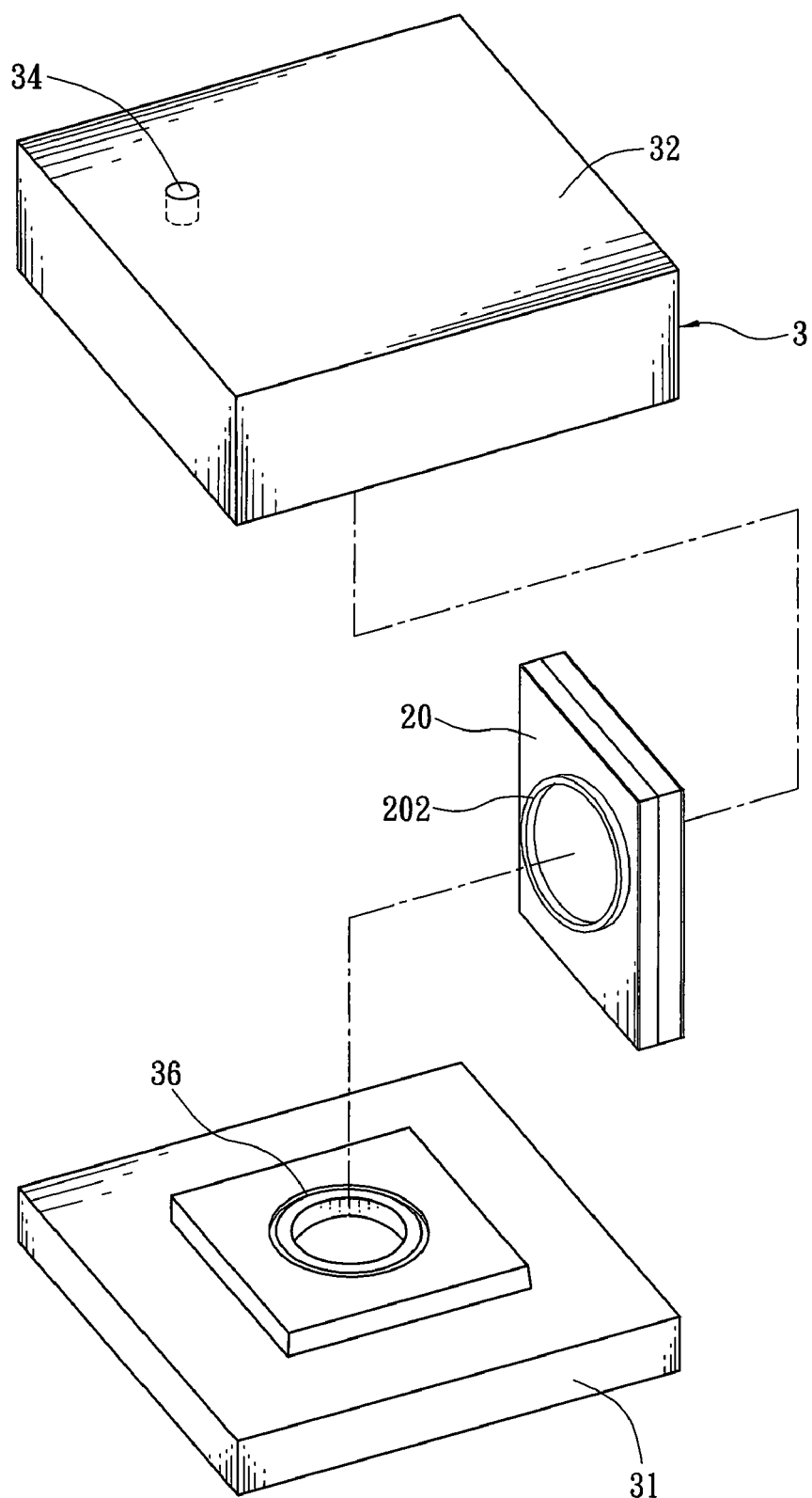
FIG. 7 shows assembling of the lens holder for alignment of the embodiment in FIG. 3.
Figure 11:
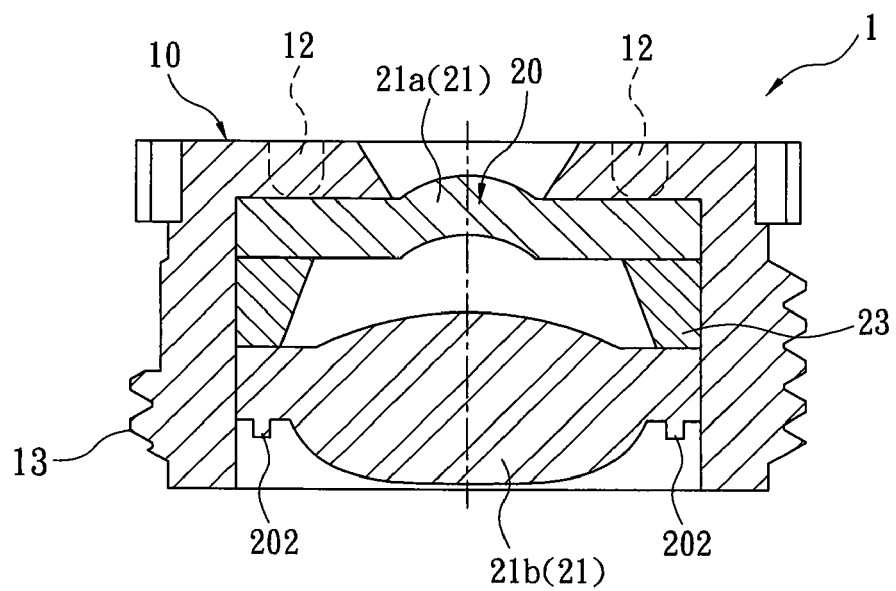
FIG. 11 is a cross sectional view of the embodiment in FIG. 9 along a line A-A'.
Figure 12:
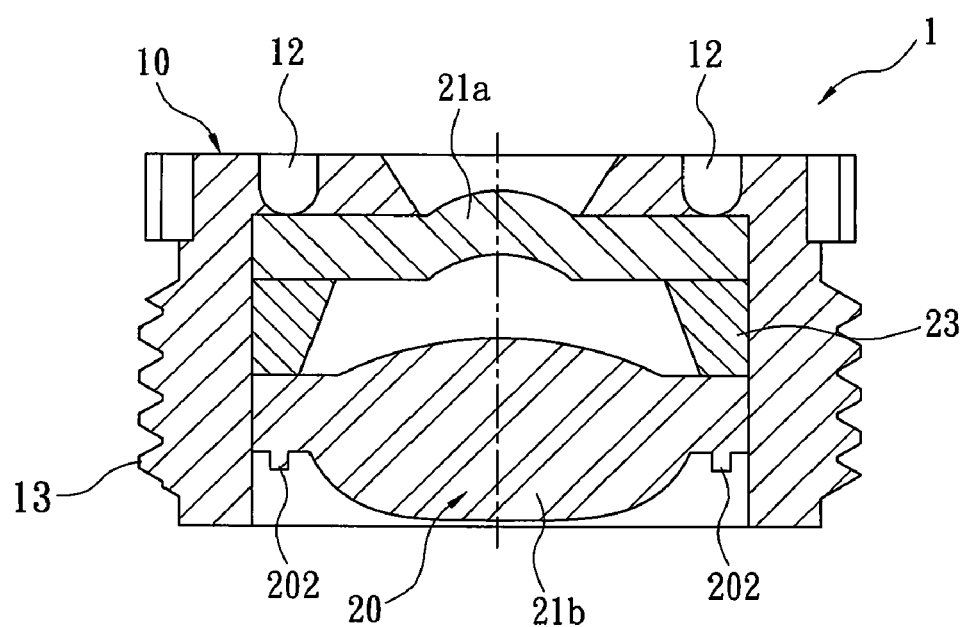
FIG. 12 is another cross sectional view of the embodiment in FIG. 9 along a line B-B'.

Refer from FIG. 3 to FIG. 5, a lens holder for alignment of a rectangular stacked lens module of camera lenses and a manufacturing method thereof. The rectangular stacked lens module 1 is produced by a rectangular stacked lens submodule 20 used as a molding insert. The molding insert is put into a cavity of a mold 3, as shown in FIG. 7. By injection or press molding of the embedded molding insert, a lens module 1 integrated with the stacked lens submodule 20 and having a rectangular lens holder for alignment 10 is formed. The stacked lens submodule 20 includes at least one rectangular optical lens 21 and related optical elements stacked and glued with one another. The glue can be thermoset glue or ultraviolet (UV) curing glue. The stacked lens submodule 20 in this embodiment consists of two optical lenses 21a, 21b, and a front-positioned aperture 22. And the stacked lens submodule 20 further includes a spacer 23, as shown in FIG. 11, FIG. 12, an IR-cut glass 24 and an image sensor (not shown in figure).

The rectangular lens holder for alignment 10 of this embodiment features on that: the second optical lens 21b of the stacked lens submodule 20 is disposed with a first alignment fixture 202 that is concentric with an optical axis of the lens and is a circular alignment bump 202. While manufacturing the second optical lens 21b, the mold of the lens is with a concentric circular groove whose center is on the optical axis of the lens optical surface so that the second optical lens 21b and the first alignment fixture 202 are produced integratedly. By the connection of the alignment bump 202 with the corresponding second alignment fixture 36 of the mold 3, the stacked lens submodule 20 is aligned and fixed. Moreover, the optical axis of the stacked lens submodule 20 is aligned with the central axis of the molded lens holder for alignment 10. The second alignment fixture 36 of the mold 3 is an alignment groove 36 corresponding to the first alignment fixture (alignment bump) 202.

Refer to FIG. 7, an injection molding method of a rectangular lens holder for alignment 10 in this embodiment according to the present invention includes following steps:

S1: provide a rectangular stacked lens submodule 20 as a molding insert; the rectangular stacked lens submodule 20 includes at least one optical lens and other optical elements stacked and glued with one another; as shown in FIG. 3, the stacked lens submodule 20 of this embodiment consists of an aperture 22, a first optical lens 21a and a second optical lens 21b, optical axes of both are aligned in advance during assembling processes. The stacked lens submodule 20 is disposed with one first alignment bump 202 that is integrated with the second optical lens 21b. The alignment bump 202 and the second optical lens 21b are concentric with the optical axis;

S2: provide an injection mold 3 of a rectangular lens holder for alignment 10 that includes a lower mold 31 and an upper mold 32. The lower mold 31 is disposed with a second alignment fixture 36. In this embodiment, the second alignment fixture 36 is an alignment groove 36 that is concentric with the optical axis;

S3: set the stacked lens submodule 20 into the lower mold 31 and the upper mold 32 to align and fix the stacked lens submodule 20 by connection of the first alignment fixture (alignment bump) 202 of the stacked lens submodule 20 with the second alignment fixture (alignment groove) 36 of the lowermold 31;

S4: heat plastic material to preset temperature and inject the plastic through an sprue 34 of the mold 3 to form the rectangular lens holder for alignment 10 by injection molding and the rectangular lens holder for alignment 10 is integrated with the stacked lens submodule 20;

S5: separate the lower mold 31 and the upper mold 32 to release an integrated rectangular stacked lens module 1 having the lens holder for alignment 10 after cooling and curing of the plastic.

The rectangular lens holder for alignment 10 of this embodiment can also be produced by press molding. The manufacturing method of the press molding and related steps are similar to those of the injection molding while the main difference between them is in the step S4: put plastic with preset weight (usually, a perform is used) into a cavity formed by the lower mold 31 and the upper mold 32 so as to perform press molding.

Figure 8:
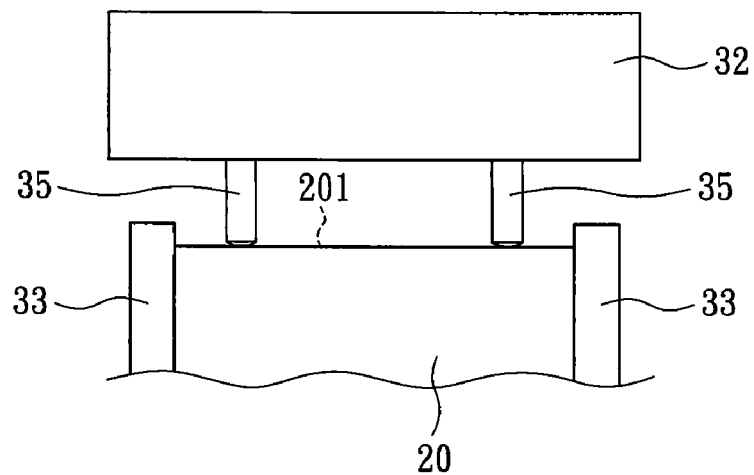
FIG. 8 shows an upper mold of the lens holder for alignment of the embodiment in FIG. 3.
Figure 9:
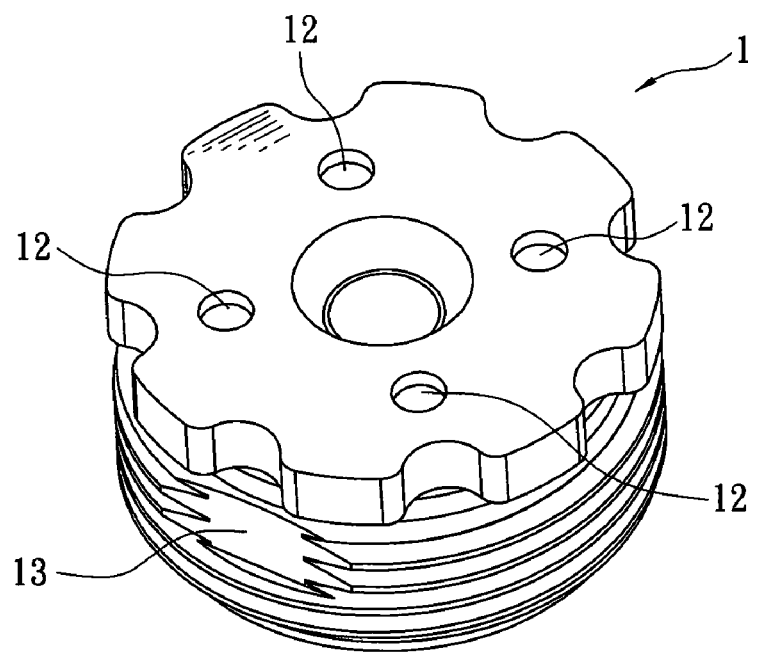
FIG. 9 is a perspective view of an embodiment applied to a round stacked lens module of camera lenses according to the present invention.
Figure 10:
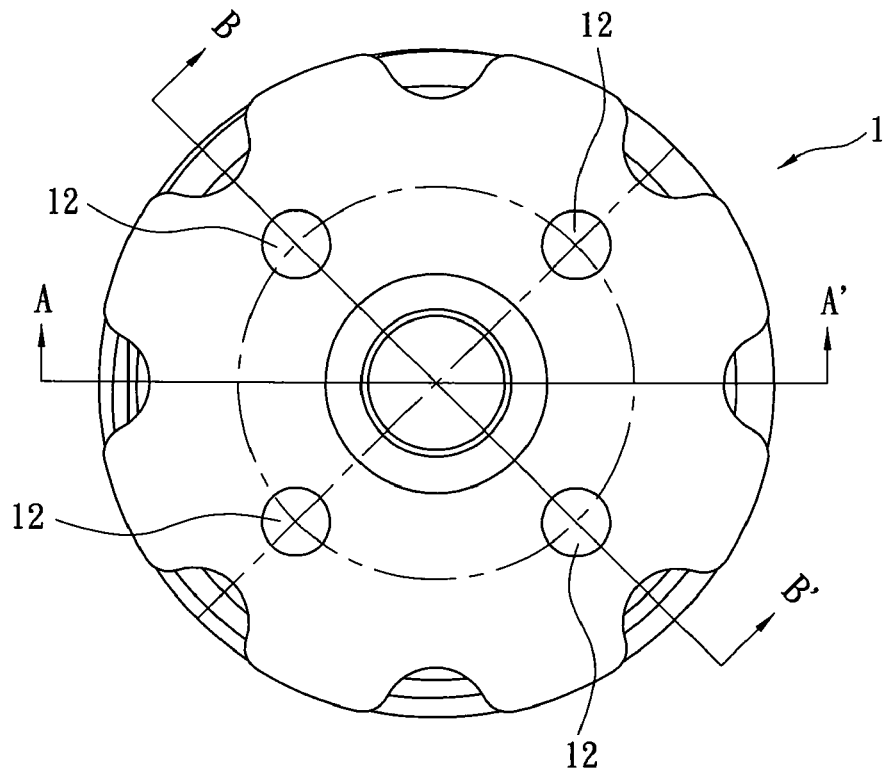
FIG. 10 is a top view of the embodiment in FIG. 9.

The rectangular lens holder for alignment 10 can further include a third alignment fixture 12 such as an alignment cavity, corresponding to a fourth alignment fixture 35 such as an alignment pin disposed on the upper mold 32. The fourth alignment fixture 35 of the upper mold 32 can be a plurality of alignments pins with the same length and arranged symmetrically and circularly such as four pins(only two are shown in FIG. 8). When the upper and the lower molds 32, 31 are closed, the fourth alignment fixture (four pins) 35 is aligned and pressed evenly on an upper surface 201 of non-optical area of the stacked lens submodule 20. Thus the optical axis of the stacked lens submodule 20 will not be oblique during injection or press molding processes and aligned with the optical axis of the molded lens holder for alignment 10. Moreover, due to the fourth alignment fixture (four pins) 35, the third alignment fixture 12 such as four alignment cavities is formed on the molded rectangular lens holder for alignment 10.

The injection molding method of this a rectangular lens holder for alignment rectangular lens holder for alignment 10 includes the steps similar to those of the injection molding method mentioned above. The difference between them is in that: the step S3 further includes a step of pressing and aligning the fourth alignment fixture 35 (four alignment pins) firmly on an upper surface 201 of non-optical area of the rectangular stacked lens submodule 20 so as to make the stacked lens submodule 20 and the integrated rectangular lens holder for alignment 10 align with the optical axis precisely.

Embodiment Two

Refer from FIG. 9 to FIG. 13, this embodiment is a lens holder for alignment of a round stacked lens module applied to mobile phone cameras and a manufacturing method thereof. A round stacked lens module 1 of this embodiment uses a round stacked lens submodule 20 as a molding insert that is put into a mold cavity. By injection molding or press molding of the molded molding inset a lens module 1 having a round lens holder for alignment 10 and integrated with the round stacked lens submodule 20 is formed. The stacked lens submodule 20 in this embodiment includes two round optical lenses 21a, 21b and a spacer 23.

Figure 15:
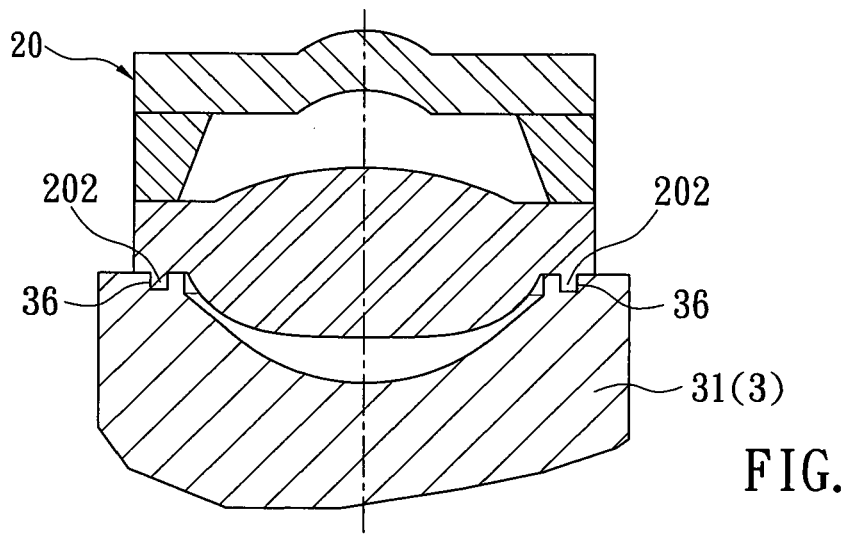
FIG. 15 shows assembling of an alignment bump of a stacked lens submodule with an alignment groove of the lower mold of the embodiment in FIG. 9.

The round lens holder 10 for alignment of the round stacked lens module 1 in this embodiment features on that: the optical lens 21b of the stacked lens submodule 20 is disposed with a first alignment fixture 202 such as an alignment bump that is concentric with the optical axis of the optical lens 21b, as shown in FIG. 11. When the stacked lens submodule 20 is set into the mold 3 (the lower mold 31) as a molding insert, as shown in FIG. 15, the stacked lens submodule 20 is aligned with the injection molded/or press molded round lens holder for alignment 10 and is aligned with the optical axis of the round lens holder for alignment 10 by connection of the alignment bump 202 with the alignment groove 36.

The injection molding method or press molding method of the round lens holder for alignment 10 consists of the steps similar to those of the embodiment one. The difference between the two embodiments is only in that: the shape of the mold cavity of the lower mold 31 and the upper mold 32 is changed from a rectangle to a round form.

Figure 13:
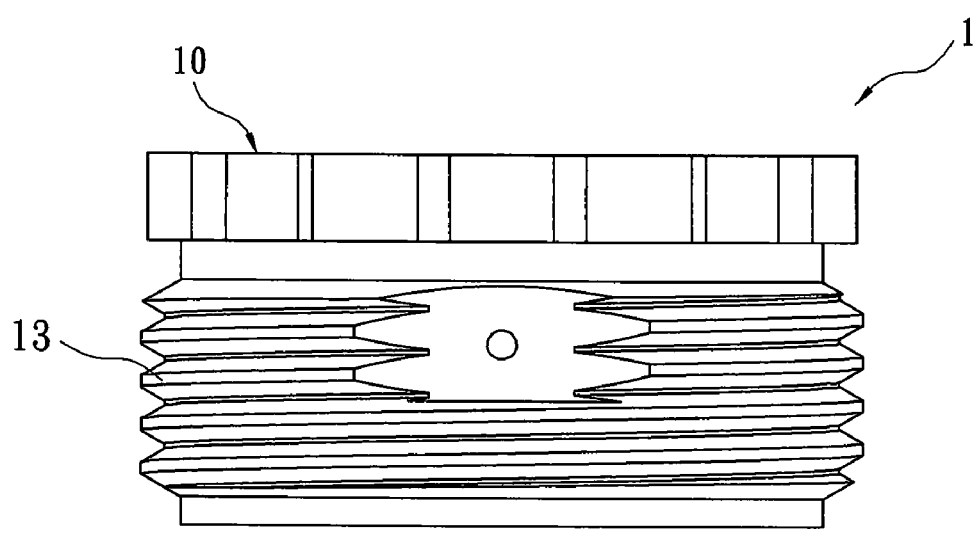
FIG. 13 is a side view of the embodiment in FIG. 9.
Figure 14:
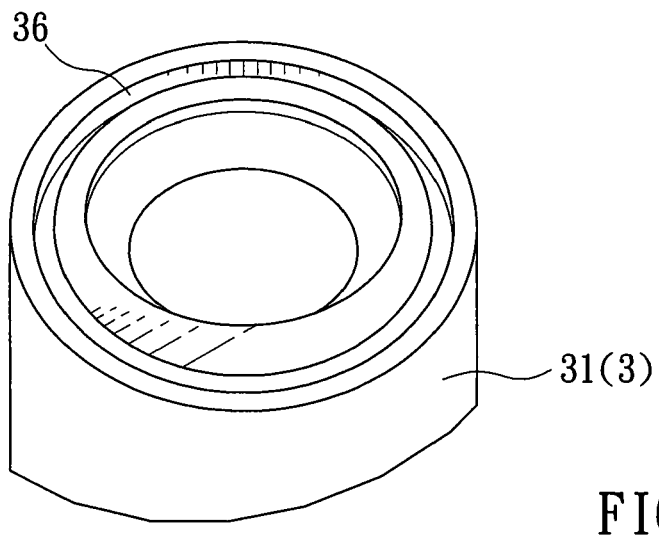
FIG. 14 shows a lower mold with at least one alignment groove of the embodiment in FIG. 9.

Similar to the above embodiment, the round lens holder for alignment 10 in this embodiment Her includes an alignment groove 12 that is formed by demolding of the alignment fixture 35 of the upper mold 32 and the injection molding method of such lens holder for alignment 10 consists of the steps similar to those of the embodiment one. Moreover, for convenience or requirement of the assembly of the stacked lens module 1, an integrated external thread 13, as shown in FIG. 13 is formed on an outer surface of the round lens holder for alignment 10.

Embodiment Three

Figure 16:
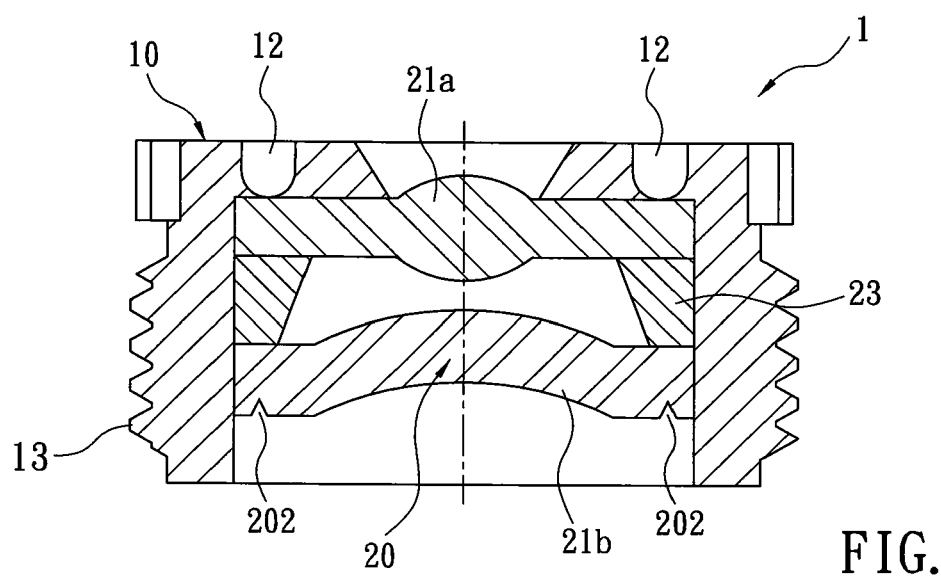
FIG. 16 is a cross sectional view of a further embodiment applied to a round stacked lens module according to the present invention.

Refer to FIG. 16, similar to the above embodiment, this embodiment is a lens holder for alignment of a round stacked lens module applied to mobile phone cameras. A round stacked lens module 1 of this embodiment uses a round stacked lens submodule 20 as a molding insert. The stacked lens submodule 20 in this embodiment includes two round optical lenses 21*a*, 21*b* and related optical elements stacked and glued with one another. The second optical lens 21*b* is a meniscus whose concave surface is on the image side. In order to produce the second optical lens 21*b* easily, a first alignment fixture 202 disposed thereof is a circular alignment groove with a V-shaped cross section and concentric with the optical axis. The lower mold 31 is arranged with a second alignment fixture 36 such as a V-shaped alignment bump 36 (not shown in figure) that is also concentric with the optical axis and corresponding to the alignment groove 202 of the stacked lens submodule 20. When the stacked lens submodule 20 is set into the mold 3 (the lower mold 31) used as an molding insert (as shown in FIG. 15), the stacked lens submodule 20 is aligned with the optical axis of the injection molded or press molded round lens holder 10 for alignment In summary, the present invention has at least the following advantages:

(1) The manufacturing method of conventional lens module has been improved by the present invention. The processes of the method are simplified, the yield rate is increased, the cost is reduced and the possibility of mass-production of the stacked lens modules is improved.

(2) The stacked lens module produced by the method of the present invention can be packed in the lenses more easily, especially suitable for small cameras and mobile phone cameras. Thus the possibility of mass-production of the lens is increased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A lens holder for alignment of a stacked lens module formed by a molding insert and molding mold by injection or press molding, the stacked lens submodule used as the molding insert;

wherein the lens holder for alignment is formed around the stacked lens submodule, characterized in that the stacked lens submodule is disposed with at least one alignment fixture that is concentric with an optical axis while the mold is arranged with at least one second alignment fixture corresponding to the first alignment fixture so that the stacked lens submodule and the lens holder for alignment are aligned with the optical axis by connection and alignment of the first alignment fixture with the second alignment fixture;

wherein the stacked lens submodule includes at least one optical lens and at least one optical element stacked and glued with each other, wherein the lens holder for alignment further includes a plurality of third alignment fixtures that is formed by a mold for injection molding or press molding; wherein the mold for injection molding or press molding is disposed with at least one fourth alignment fixture that enables the stacked lens submodule aligning with the optical axis and makes the lens holder for alignment have a corresponding third alignment fixture after being released from the mold.

2. The device as claimed in claim 1, wherein the optical element of the stacked lens submodule is an optical lens, a spacer, an aperture, a cover glass, an infrared-cut glass, an image sensor or their combinations.

3. The device as claimed in claim 1, wherein the mold includes an upper mold and a lower mold and the second alignment fixture is disposed at the upper mold or the lower mold.

4. The device as claimed in claim 1, wherein the first alignment fixture is an alignment bump or an alignment groove concentric with the optical axis while the second alignment fixture is an alignment groove or an alignment bump concentric with the optical axis and connecting with the first alignment fixture correspondingly.

5. The device as claimed in claim 1, wherein the mold includes an upper mold and a lower mold while the fourth alignment fixture is arranged at the upper mold or the lower mold.

\* \* \* \* \*